United States Patent
Lee et al.

(10) Patent No.: US 7,184,361 B2
(45) Date of Patent: Feb. 27, 2007

(54) METHOD AND APPARATUS FOR AVOIDING BI-DIRECTIONAL SIGNAL FIGHTING OF SERIAL INTERFACE

(75) Inventors: Yu-Chu Lee, Jhubei (TW); Sheng-Ping Chen, Sinjhuang (TW); Geng-Lin Chen, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 101 days.

(21) Appl. No.: 11/158,409

(22) Filed: Jun. 21, 2005

(65) Prior Publication Data
US 2006/0187741 A1    Aug. 24, 2006

(30) Foreign Application Priority Data
Feb. 24, 2005    (TW) ............................... 94105549 A

(51) Int. Cl.
*G11C 8/00* (2006.01)
(52) U.S. Cl. .................... 365/233; 710/58; 710/305; 327/333

(58) Field of Classification Search ................ 365/233; 710/58, 305; 327/333
See application file for complete search history.

(56) References Cited

U.S. PATENT DOCUMENTS

| 5,841,996 A * | 11/1998 | Nolan et al. ................. 710/305 |
| 2005/0122154 A1 * | 6/2005 | Lee et al. ..................... 327/333 |
| 2006/0239104 A1 * | 10/2006 | Lee et al. .............. 365/230.01 |

* cited by examiner

*Primary Examiner*—Tuan T. Nguyen
*Assistant Examiner*—Eric J. Wendler
(74) *Attorney, Agent, or Firm*—J.C. Patents

(57) ABSTRACT

A method and apparatus for avoiding bi-directional signal fighting of a serial interface is disclosed. The serial peripheral interface includes a clock signal line and a data line. In this method, during normal operation, a first clock signal is received and transformed to output a second clock signal in the clock signal line, wherein the second clock signal has a first duty period. When the output of the data in the data line switches to input, the second clock signal switches to have the second duty period, wherein the second duty period is larger than the first duty period.

5 Claims, 5 Drawing Sheets

METHOD AND APPARATUS FOR AVOIDING BI-DIRECTIONAL SIGNAL FIGHTING OF SERIAL INTERFACE

CROSS-REFERENCE TO RELATED APPLICATION

This application claims the priority benefit of Taiwan application serial no. 94105549, filed on Feb. 24, 2005. All disclosure of the Taiwan application is incorporated herein by reference.

BACKGROUND OF THE INVENTION

1. Field of the Invention

The present invention relates to a method and apparatus related to a serial interface, and more particularly to a method and apparatus for avoiding a bi-directional signal fighting of a serial interface.

2. Description of the Related Art

A standard serial peripheral interface (SPI) comprises a serial clock signal (SCK) line, a serial data input (SI) line, and a serial data output (SO) line for data transmission. Referring to the waveform in FIG. 1, SCK represents the serial clock signal of the serial clock signal line, SI represents the serial data input line signal, and SO represents the serial data output line signal. Wherein, the SPI standard includes a transmission protocol. In the apparatus, the serial data input line outputs a data according to the positive edge-trigger of each clock of the serial clock signal SCK. Moreover, the serial data output line outputs a data according to the negative edge-trigger of each clock of the serial clock signal SCK. At the beginning of the transmission, the serial input line outputs an 8-bit signal, i.e., the Bit7, Bit6, Bit5, Bit4, Bit3, Bit2, Bit1, and Bit0 shown in the SI waveform of FIG. 1, according to the rising edge of the serial clock signal SCK. In addition, the serial output line outputs an 8-bit signal, i.e., the Bit7, Bit6, Bit5, Bit4, Bit3, Bit2, Bit1, and Bit0 shown in the SO waveform of FIG. 1, according to the falling edge of the second clock signal SCK.

However, it had been considered that the serial input data line and the serial output data line be merged to save pin-count by using the bi-directional signal line transmission. In the standard serial transmission interface, there is no bi-directional signal switch mechanism. While the directions of the signals of the bi-directional data line are switched, signal fighting may occur due to various delays. As shown in the waveform of FIG. 2, when the transmission starts, the serial clock signal SCK begins action. When the input SI of the data line is switched from input SI to output SO, the signal fighting shown in this figure occurs. During the bi-directional signal line transmission, both apparatuses may be driven simultaneously. If the signal fighting occurs, the circuit is subject to damage due to short circuit. Thus, one approach is to change the transmission protocol. The signal turn-around cycle is added in the protocol. This approach, however, has disadvantages. For example, the signal turn-around cycle is not compatible with the original standard serial interface protocol, the transmission time is increased, and the transmission efficiency is reduced.

SUMMARY OF THE INVENTION

Accordingly, the present invention is directed to a master apparatus for avoiding bi-directional signal fighting of a serial interface. The master apparatus avoids the possible signal fighting during input/output switch when the serial interface switches to the bi-directional signal line transmission signal.

The present invention is also directed to a method for avoiding bi-directional signal fighting of the serial interface. The method avoids possible signal fighting during input/output switch when the serial interface switches to the bi-directional signal line transmission signal.

The present invention is further directed to an apparatus for avoiding the bi-directional signal fighting of the serial interface. The apparatus avoids possible signal fighting in the switch of the input/output direction when the serial interface switches to the bi-directional signal line transmission signal.

The present invention provides a master apparatus for avoiding bi-directional signal fighting of a serial interface. The serial interface comprises a clock signal line and a data line. The master apparatus comprises a serial interface clock signal generator and a controller. Wherein, during normal operation, the serial interface clock signal generator receives and transforms a first clock signal to output a second clock signal in the clock signal line, wherein the second clock signal has a first duty period. The controller is coupled to the serial interface clock signal generator. When output of the data in the data line switches to input, the controller outputs a control signal to the serial interface clock signal generator, wherein the second clock signal switches to have a second duty period, and that the second duty period is larger than the first duty period.

According to the master apparatus for avoiding the bi-directional signal fighting of the serial interface, the second duty period described above is at least larger than, or equal to the first duty period plus a period of the first clock signal.

The present invention provides a method of avoiding bi-directional signal fighting of a serial interface. The serial interface comprises a clock signal line and a data line. In the method, a first clock signal is received and transformed to output a second clock signal in the clock signal line during normal operation, wherein the second clock signal has a first duty period. When output of the data in the data line switches to input, the second clock signal switches to have a second duty period, wherein the second duty period is larger than the first duty period.

According to the method of avoiding bi-directional signal fighting of the serial interface, the second duty period described above is at least larger than, or equal to the first duty period plus a period of the first clock signal.

The present invention provides an apparatus for avoiding bi-directional signal fighting of a serial interface. The serial interface comprises a clock signal line and a data line. The master apparatus comprises a serial interface clock signal generator and a controller. Wherein, during normal operation, the serial interface clock signal generator receives and transforms a first clock signal to output a second clock signal in the clock signal line, wherein the second clock signal has a first duty period. The controller is coupled to the serial interface clock signal generator. When output of the data in the data line switches to input, the controller outputs a control signal to the serial interface clock signal generator so that the second clock signal switches to have a second duty period, wherein the second duty period is larger than the first duty period.

In the present invention, the method of changing the duty period is used, when the output of the data of the data line switches to input. The signal fighting resulting from signal transmission of the bi-directional signal line of the serial transmission interface can be avoided.

The above and other features of the present invention will be better understood from the following detailed description of the preferred embodiments of the invention that is provided in communication with the accompanying drawings.

DESCRIPTION OF SOME EMBODIMENTS

Figure 1:
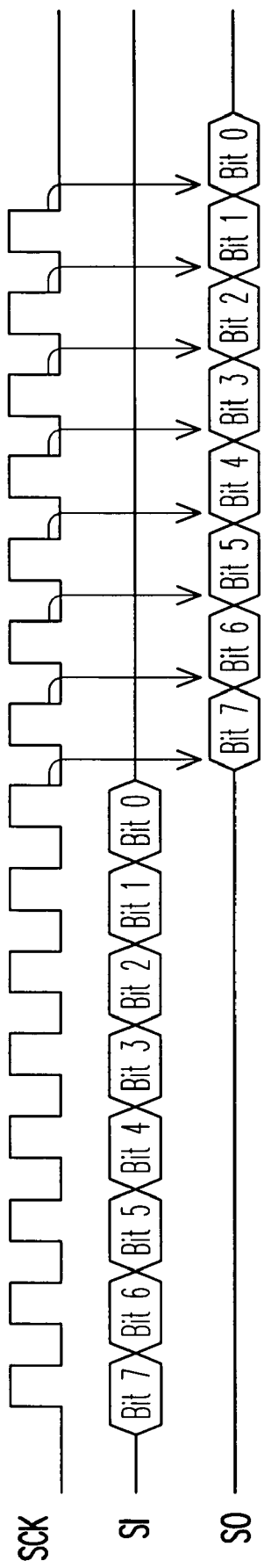
FIG. 1 is a waveform of a transmission protocol of a conventional SPI standard.
Figure 2:
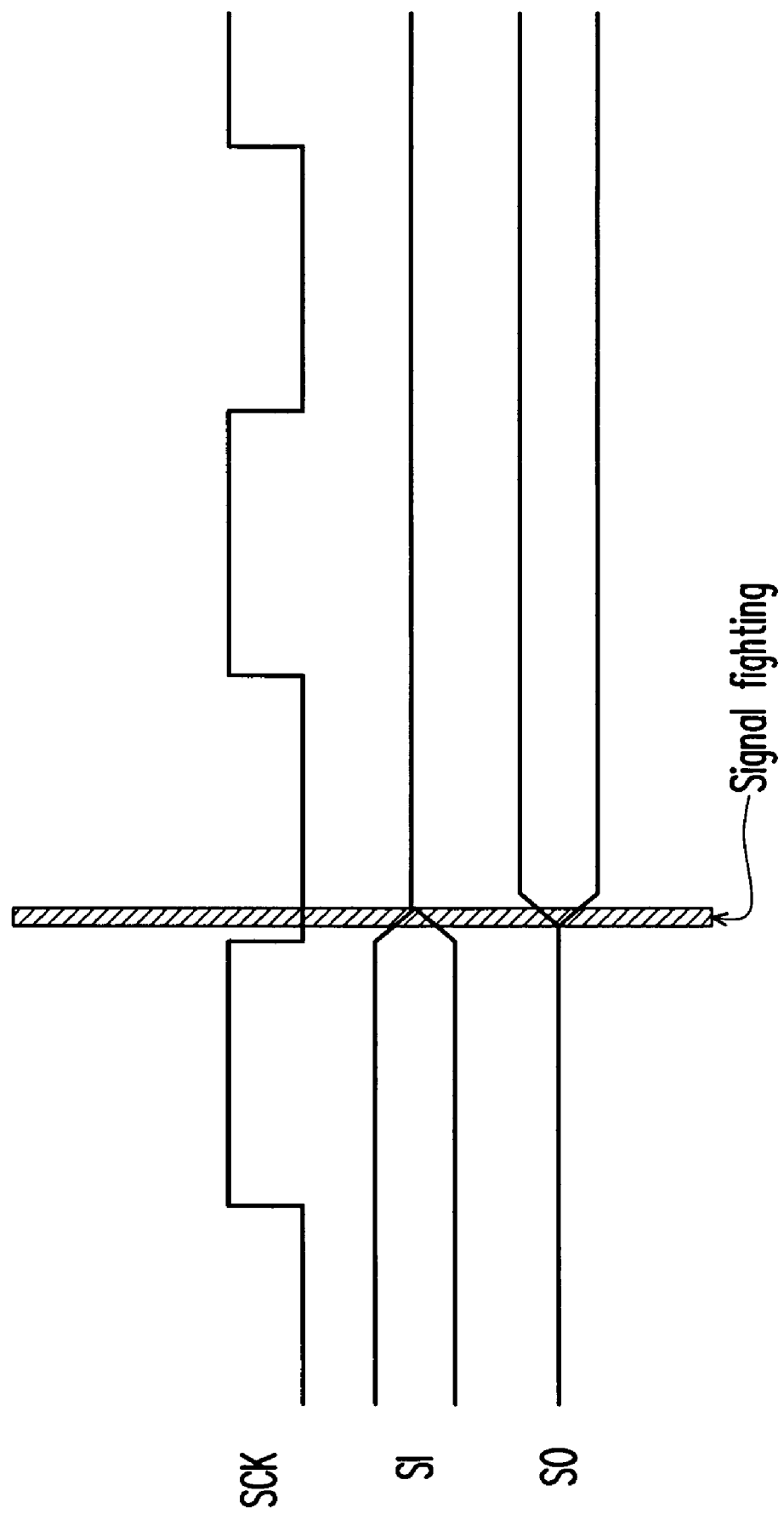
FIG. 2 is a waveform showing signal fighting resulting from reducing the serial interface pin-count in the prior art.
Figure 3:
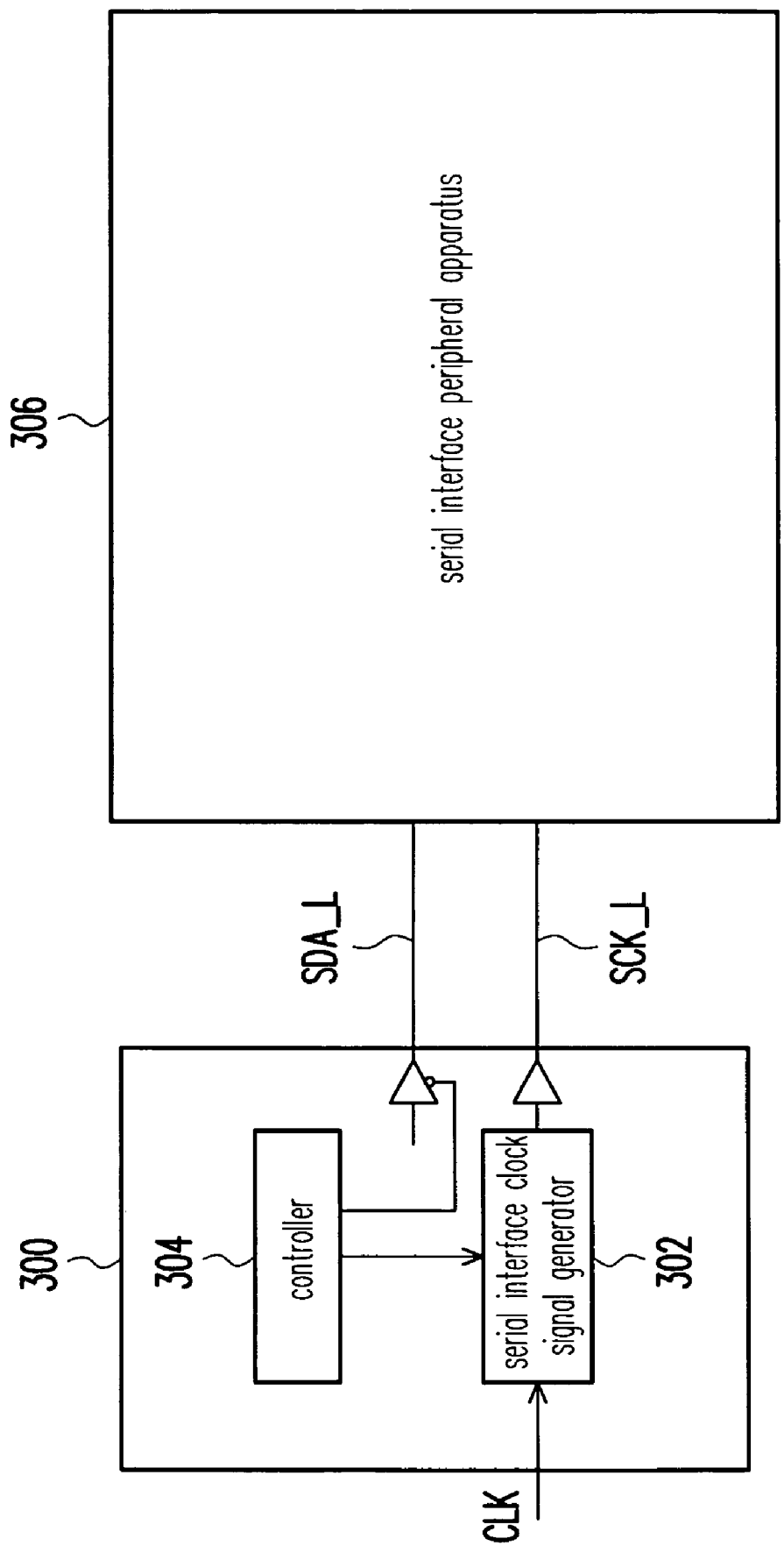
FIG. 3 is a schematic circuit block diagram showing a serial interface containing the master apparatus for avoiding bi-directional signal fighting according to an embodiment of the present invention.

FIG. 3 is a schematic circuit block diagram showing a serial interface containing the master apparatus for avoiding bi-directional signal fighting according to an embodiment of the present invention. Referring to FIG. 3, the serial interface comprises the serial clock signal line SCK_L and the serial data signal line SDA_L. The master apparatus 300 for avoiding bi-directional signal fighting of a serial interface of the present invention comprises a serial interface clock signal generator 302 and a controller 304. Wherein, during normal operation, the serial interface clock signal generator 302 receives and transforms the first clock signal CLK to output the second clock signal SCK in the serial clock signal line SCK_L. The second clock signal SCK has a first duty period. The controller 304 is coupled to the serial interface clock signal generator 302. When output of the data in the serial data line SDA_L switches to input, the controller 304 outputs a control signal to the serial interface clock signal generator 302 so that the second clock signal SCK switches to have a second duty period, and that the second duty period is larger than the first duty period. One of ordinary skill in the art knows that the output and input of the data are positive edge-triggered and negative edge-triggered, respectively. Regardless of the input/output switch or the output/input switch, the present invention can be applied as long as the input and output directions are changed. In addition, the serial interface comprises a serial interface peripheral apparatus 306. The serial interface peripheral apparatus 306 receives the data transmitted from the serial data line SDA_L based on the second clock signal SCK. When the data in the serial data line SDA_L are received completely, the data are transmitted to the master apparatus 300 through the serial data line SDA_L based on the falling edge of the second clock signal.

Figure 4:
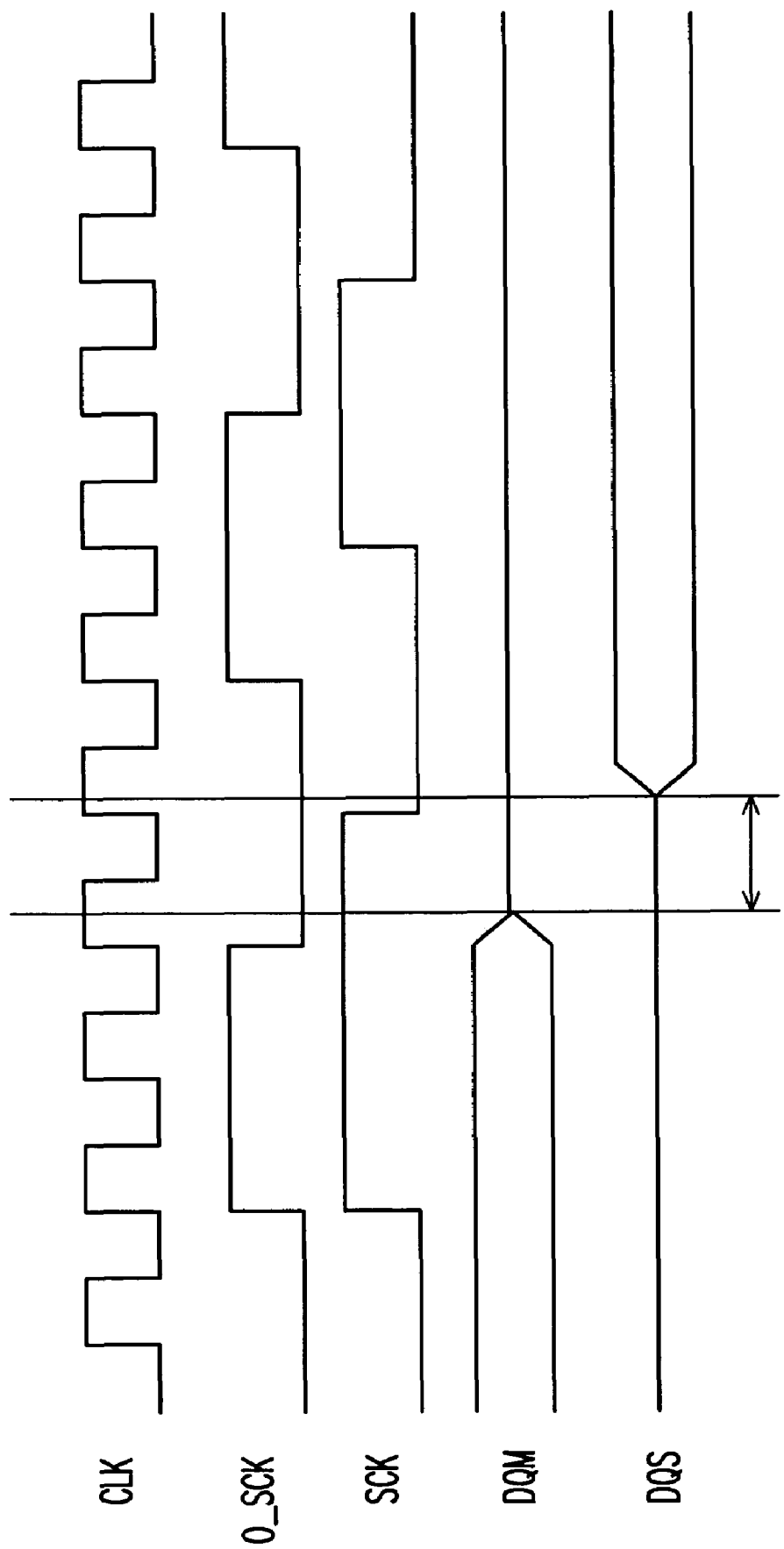
FIG. 4 is a configuration of waveforms generated by a master apparatus for avoiding a bi-directional signal fighting of a serial interface during transmission according to an embodiment of the present invention.

FIG. 4 is a configuration of waveforms generated by a master apparatus for avoiding bi-directional signal fighting of a serial interface during transmission according to an embodiment of the present invention. The waveforms include the first clock signal CLK, the original serial clock signal O_SCK, the second clock signal SCK of the present invention, the data waveform DQM of the master apparatus, and the data waveform DQS of the peripheral apparatus. Referring to FIGS. 3 and 4, when output of the data of the data line switches to input, the controller 304 controls the serial interface clock signal generator 302 so that the serial interface clock signal generator 302 increases the duty period of the second clock signal SCK of the last data by at least one period of the first clock signal. After the data transmission, and the driving of the hardware driver is off, the second clock signal SCK falls. It can be found in the difference between the original serial clock signal O_SCK and the second clock signal SCK. The peripheral apparatus 306 transmits the data to the master apparatus 300 through the serial data signal line SDA_L based on the falling edge of the second clock signal SCK. Accordingly, the signal fighting can be avoided.

Figure 5:
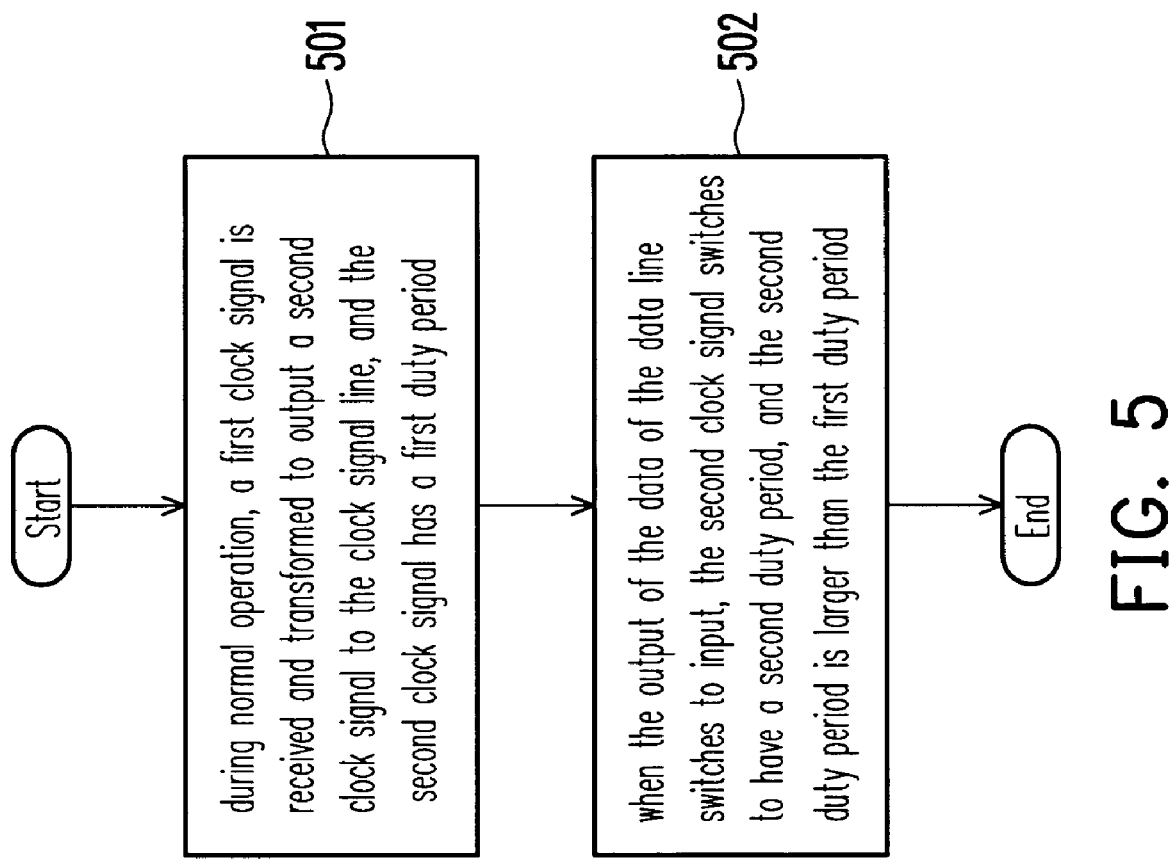
FIG. 5 is a flowchart showing a method of avoiding a bi-directional signal fighting of the serial interface according to an embodiment of the present invention.

FIG. 5 is a flowchart showing a method of avoiding bi-directional signal fighting of the serial interface according to an embodiment of the present invention. Referring to FIGS. 3–5, when the transmission starts, the serial interface clock signal generator 302 of the master apparatus receives and transforms the first clock signal CLK to output the second clock signal SCK in the serial clock signal line SCK_L, and the second clock signal SCK has a first duty period in the step 501. In the step 502, when the controller 304 detects the change from the output to the input of the data SDA in the serial data line SDA_L, the control signal is transmitted to the serial interface clock signal generator 302. After the serial interface clock signal generator 302 receives the control signal, the second clock signal SCK switches to have the second duty period, and the second duty period is larger than the first duty period. Accordingly, the output/input signal fighting can be avoided.

Accordingly, the method of changing the duty period is adopted in the present invention while the output and input directions of the data of the data line are changed. Accordingly, the signal fighting can be avoided during the signal transmission in the bi-directional signal line of the serial interface.

Although the present invention has been described in terms of, exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A master apparatus for avoiding bi-directional signal fighting of a serial interface, the serial interface comprising a clock signal line and a data line, the master apparatus comprising:
   a serial interface clock signal generator, receiving and transforming a first clock signal to output a second clock signal in the clock signal line, wherein the second clock signal having a first duty period during normal operation; and
   a controller, coupled to the serial interface clock signal generator, when output of data in the data line switching to input, the controller outputting a control signal to the serial interface clock signal generator so that the second clock signal switches to have a second duty period, wherein the second duty period is larger than the first duty period.

2. The master apparatus for avoiding bi-directional signal fighting of a serial interface of claim 1, wherein the second duty period is at least larger than, or equal to the first duty period plus a period of the first clock signal.

3. The master apparatus for avoiding bi-directional signal fighting of a serial interface of claim 1, wherein the serial interface comprises at least a serial interface peripheral apparatus, the serial interface peripheral apparatus receiving the data transmitted from the data line based on the second clock signal, and when the data of the data line are received completely, the data being transmitted to the master apparatus through the data line based on the second clock signal.

4. A method of avoiding bi-directional signal fighting of a serial interface, the serial interface comprising a clock signal line and a data line, the method comprising:

receiving and transforming a first clock signal to output a second clock signal in the clock signal line, wherein the second clock signal having a first duty period during normal operation; and when output of data of the data line switches to input, the second clock signal switching to have a second duty period, wherein the second duty period being larger than the first duty period.

5. The method of avoiding bi-directional signal fighting of a serial interface of claim 4, wherein the second duty period is at least larger than, or equal to the first duty period plus a period of the first clock signal.

* * * * *